(12) United States Patent
Galvez et al.

(10) Patent No.: US 10,935,803 B2
(45) Date of Patent: Mar. 2, 2021

(54) METHOD TO DETERMINE THE TOPOLOGICAL CHARGE OF AN OPTICAL BEAM

(71) Applicants: Enrique Jose Galvez, Hamilton, NY (US); Behzad Khajavi, Houston, TX (US)

(72) Inventors: Enrique Jose Galvez, Hamilton, NY (US); Behzad Khajavi, Houston, TX (US)

(73) Assignee: COLGATE UNIVERSITY, Hamilton, NY (US)

(*) Notice: Subject to any disclaimer, the term of this patent is extended or adjusted under 35 U.S.C. 154(b) by 99 days.

(21) Appl. No.: 16/373,740

(22) Filed: Apr. 3, 2019

(65) Prior Publication Data

US 2019/0310484 A1   Oct. 10, 2019

Related U.S. Application Data

(60) Provisional application No. 62/652,884, filed on Apr. 4, 2018.

(51) Int. Cl.
| | |
|---|---|
| *G02B 27/14* | (2006.01) |
| *G02B 21/36* | (2006.01) |
| *G02B 23/14* | (2006.01) |
| *G02B 27/09* | (2006.01) |

(52) U.S. Cl.
CPC ......... *G02B 27/14* (2013.01); *G02B 27/0955* (2013.01)

(58) Field of Classification Search
CPC .... G02B 27/144; G02B 27/145; G02B 13/00; G02B 21/361; G02B 21/24; G02B 21/22; G02B 21/025; G02B 21/241; G02B 21/06; G02B 21/082; G02B 23/14; G02B 23/2446
USPC ....... 359/638, 629, 618, 362, 363, 368, 369, 359/379, 380, 382, 383, 388, 389, 432, 359/434, 435
See application file for complete search history.

(56) References Cited

U.S. PATENT DOCUMENTS

| | | | | |
|---|---|---|---|---|
| 2004/0017607 A1* | 1/2004 | Hauger | .................. | G02B 21/22 359/376 |
| 2009/0168163 A1* | 7/2009 | Frazier | ................ | G06F 21/6254 359/432 |
| 2010/0067103 A1* | 3/2010 | Sangu | .................. | G02B 21/008 359/385 |

* cited by examiner

*Primary Examiner* — Dawayne Pinkney
(74) *Attorney, Agent, or Firm* — Bond Schoeneck & King, PLLC; George McGuire

(57) ABSTRACT

An apparatus for determining a topological charge of one of more optical beams. For single beams, a trapezoidal optical element having a front face and an opposing rear face that is not parallel to the front face is oriented so that the optical beam is reflected in a direction other than along the optical path. The reflection of the optical beam by the trapezoidal optical element produces an interference pattern that can be captured by an optical imager and that can be decoded to determine the topological charge of the optical beam. For a plurality of superpositioned beams, an air spaced trapezoidal optical element may oriented to reflect the plurality of beams onto an optical imager to capture the interference pattern. The interference pattern may be interpreted to identify the topological charge of each of the plurality of optical beams.

7 Claims, 12 Drawing Sheets

US 10,935,803 B2

METHOD TO DETERMINE THE TOPOLOGICAL CHARGE OF AN OPTICAL BEAM

CROSS-REFERENCE TO RELATED APPLICATIONS

The present application claims priority to U.S. Provisional App. No. 62/652,884 filed on Apr. 4, 2018.

BACKGROUND OF THE INVENTION

1. Field of the Invention

The present invention related to optical communications systems and, more specifically, to a system and method for decoding information encoded into the topographical charge of an optical beam.

2. Description of the Related Art

Laguerre-Gaussian (LG) beams have been widely implemented in optical experiments due to the optical vortices that they carry and the associated orbital angular momentum. These beams have found a wide number of applications, including rotational control in optical tweezers, quantum-information encoding, optical communications, optical coronagraphy, and stimulated emission depletion microscopy. The orbital angular momentum that they carry, the vorticity of the phase vortex, and the azimuthal order of the mode are all specified by the topological charge, l, which is the number of windings of the phase per revolution about the center of the mode. Thus, determining experimentally the topological charge of an LG beam is vitally important.

Numerous methods for determining the topological charge have been investigated. These include various forms of interference, such as interference with a plane wave, with its displaced copy in a Mach-Zehnder interferometer, in nested interferometers with mode rotators; and passage through optical elements, such as a double slit, a single slit, a triangular aperture, cylindrical lens mode converters, a single cylindrical lens, and conformational optics. Accordingly, there is a need in the art for an approach that can detect and measure the topological charge of Laguerre-Gauss beam. In addition, there is a need in the art for an approach that can detect and measure the topological charge of each of a multiple beams that are superpositioned.

BRIEF SUMMARY OF THE INVENTION

The present invention provides an approach for determining the topological charge of one or more optical beams. In a first embodiment, the present invention is an apparatus for determining the topological charge of an optical beam that has a pair of confocal lenses preparing the wavefront of the optical beam (making it planar for zero topological charge so that it has infinite radius of curvature). A trapezoidal optical element (TOE), either made of solid glass or air spaced, having a front face formed by the right angles of a right trapezoid cross-section and an opposing rear face that is not parallel to the front face is oriented so that axis of the trapezoidal prism defines a non-perpendicular angle of incidence for the optical beam. One component of the optical beam is reflected in a direction other than along the optical path but in the same horizontal plane as the incident beam, and the other reflected component of the optical beam, is laterally displaced from the first one, but tilted in the vertical plane. An optical imager is positioned to capture a digital image of the optical beam after reflection by the TOE. The reflection of the optical beam by the TOE produces an interference pattern. The interference pattern unambiguously corresponds to the topological charge of the optical beam.

In a second embodiment, the present invention is an apparatus for decoding modal superpositions of optical beams. The apparatus has a series of lenses to planarize the optical wavefront, as in the first case. A beam splitter forms a second optical path and a third optical path from the first optical path. A first optical imager is aligned along the second optical to capture digital images of the plurality of light beams. A TOE is positioned along the third optical path and oriented to define a non-perpendicular angle of incidence for the plurality of optical beams so that the plurality of optical beams are reflected in a direction other than along the third optical path. A second optical imager is aligned with the TOE to capture optical images of the plurality of optical beams after reflection by the shear interferometer. The reflection of the plurality of optical beams by the shear interferometer produces a convolved interference pattern. The topological charge of each of the plurality of optical beams can be extracted from the interference pattern.

BRIEF DESCRIPTION OF THE SEVERAL VIEWS OF THE DRAWING(S)

The present invention will be more fully understood and appreciated by reading the following Detailed Description in conjunction with the accompanying drawings, in which:

FIG. 1 is a schematic of a system for detecting the topological charge of Laguerre-Gauss beam according to the present invention;

FIG. 2 is a schematic of a solid-glass TOE for a topological charge detection system according to the present invention; and FIG. 3 is a series of images of the interference pattern formed by a system for detecting the topological charge of Laguerre-Gauss beam according to the present invention FIG. 4 is a schematic of the shape of the fringes based on the phase shift due to the component of k in the $-\hat{y}$ direction and azimuthal terms of the two vortices in Eq. (6), where the wedged element makes two displaced copies of the input mode, side by side, and the arrows show the direction of the phase gradients;

Figure 9:
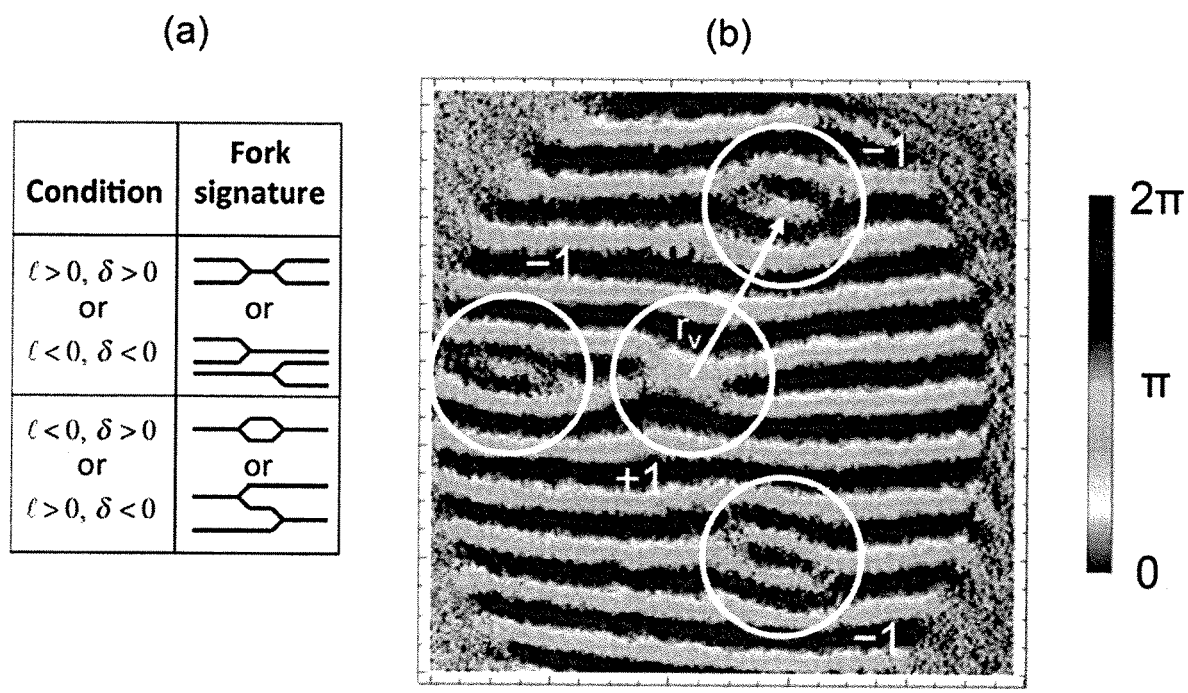
Figure 10:
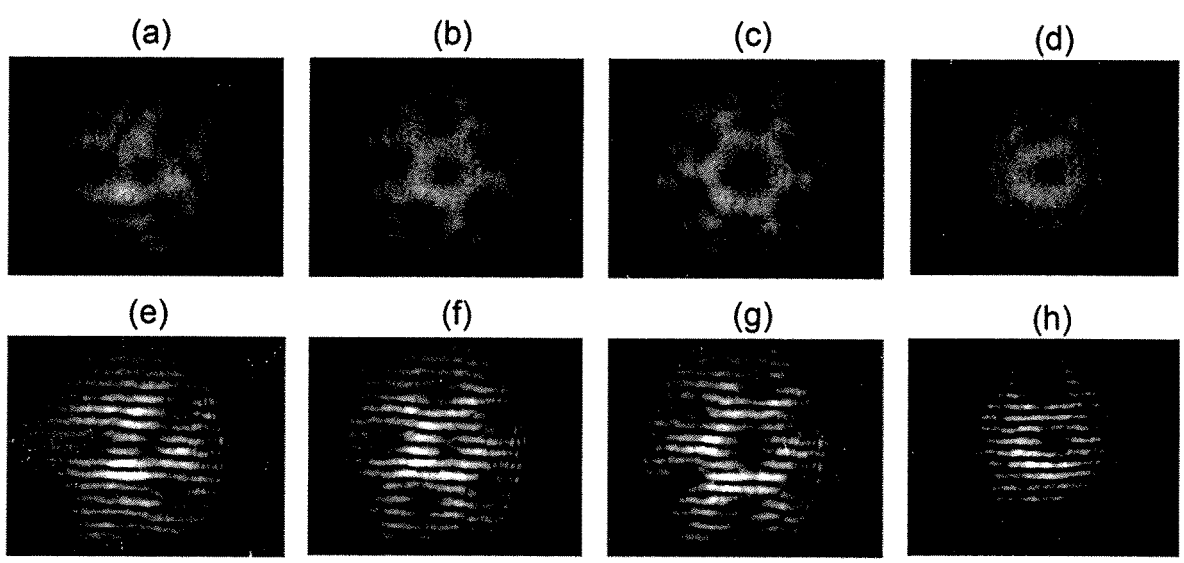
Figure 11:
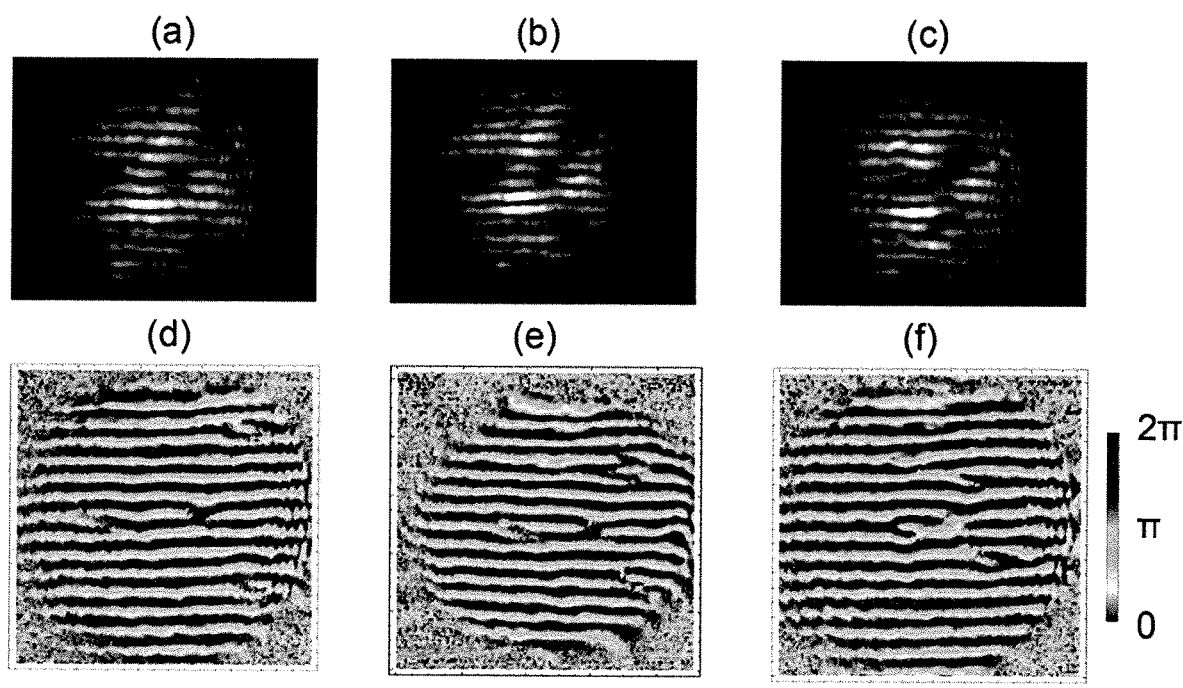
Figure 12:
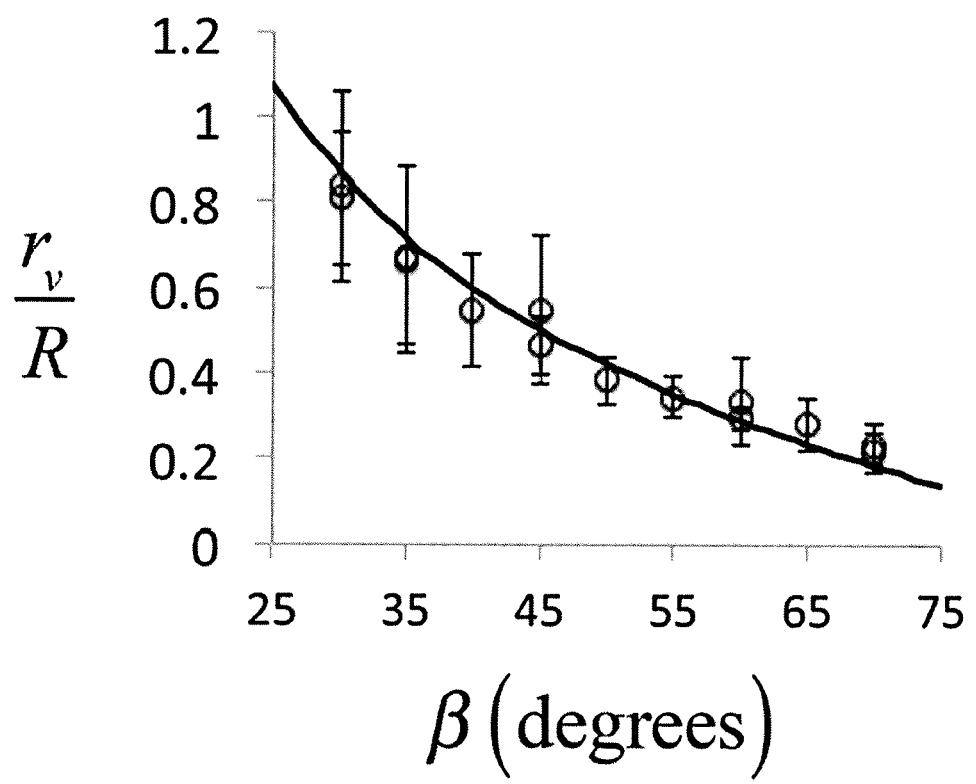

FIG. 9 is: (a) a table showing the conditions that lead to distinct shear patterns of optical vortices along with their signature in the pattern, where d>0 corresponds to the second reflection deflected downward relative to the first reflection off the shear interferometer; and (b) a phase pattern of the shear interference of the superposition of modes with topological charges $l_1=+1$ and $l_2=-2$ with the arrangement of vortices produced by the superposition labeled and the measured radial distance of the vortices r, taken as the distance between the center of the central pattern and the center of each of the peripheral vortices;

FIG. 10 is a series of images of second beam of equal-amplitude superpositions of modes with topological charges (1,-2) in (a), (1,-4) in (b), (2,-4) in (c) and (-1,-2) in (d), and the images in the second row (e-h) are the shear interferograms of the third beam corresponding to the superpositions above them;

FIG. 11 is, in the top row, a series of shear interferograms of the superposition of modes with topological charges $l_1=+1$ and $l_2=-2$ for several values of β: 35° in (a), 45° in (b) and 60° in (c) and, in the bottom row, reconstructions of the phase of the light field corresponding to the shear patterns above them, where the false color encodes phase FIG. 12 is a graph of the radial position of the peripheral vortices relative to the beam radius as a function of the parameter β that determines the ratio of the amplitudes of the modes in Equation (2) of Example 2, where the data shown correspond to the case (+1,-2) and the solid line corresponds to the $r_{v-LG}/\sqrt{2}w$ in Equation (4) of Example 2.

DETAILED DESCRIPTION OF THE INVENTION

Figure 1:
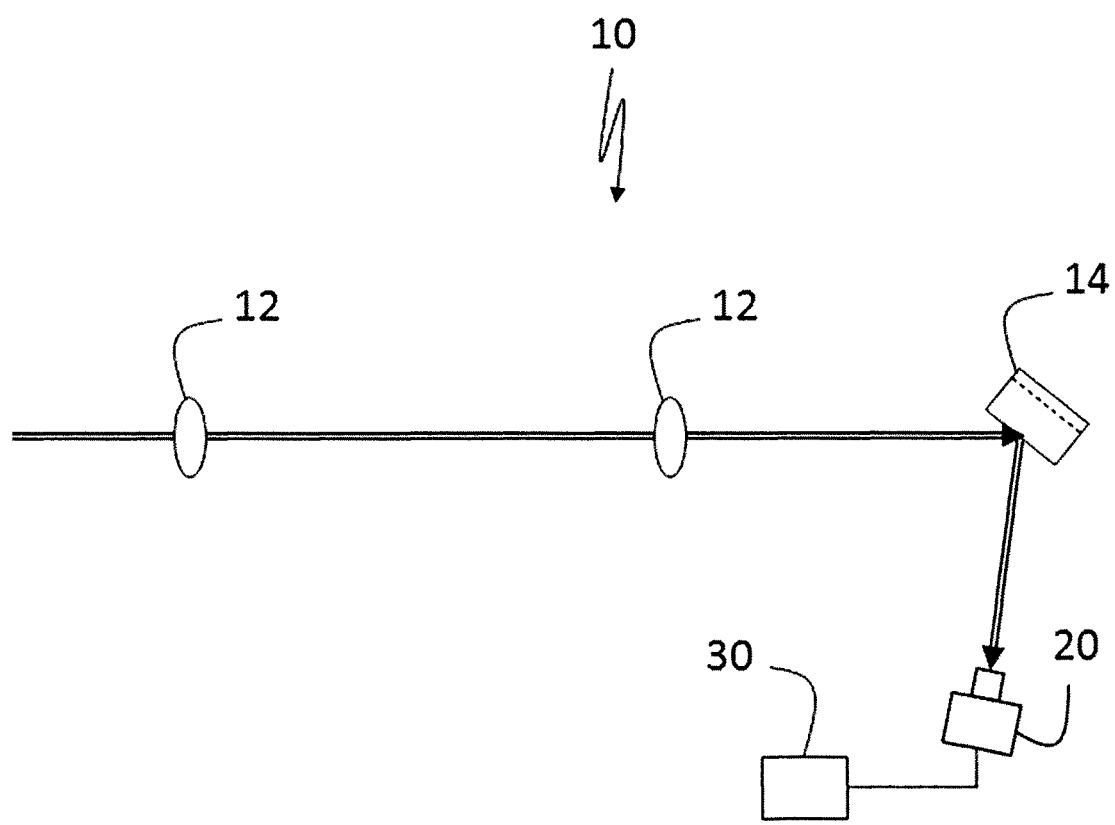

Referring to the figures, wherein like numeral refer to like parts throughout, there is seen in FIG. 1 a system 10 for detecting the topological charge of Laguerre-Gauss beam using a lateral shearing interferometer. System 10 comprises a pair of confocal lenses 12 that are aligned along a common axis X-X to eliminate any curvature of a beam input along axis X-X. A wedged glass TOE 14 is positioned in line with axis X-X of lenses 12 and oriented at an angle A relative thereto.

Figure 2:
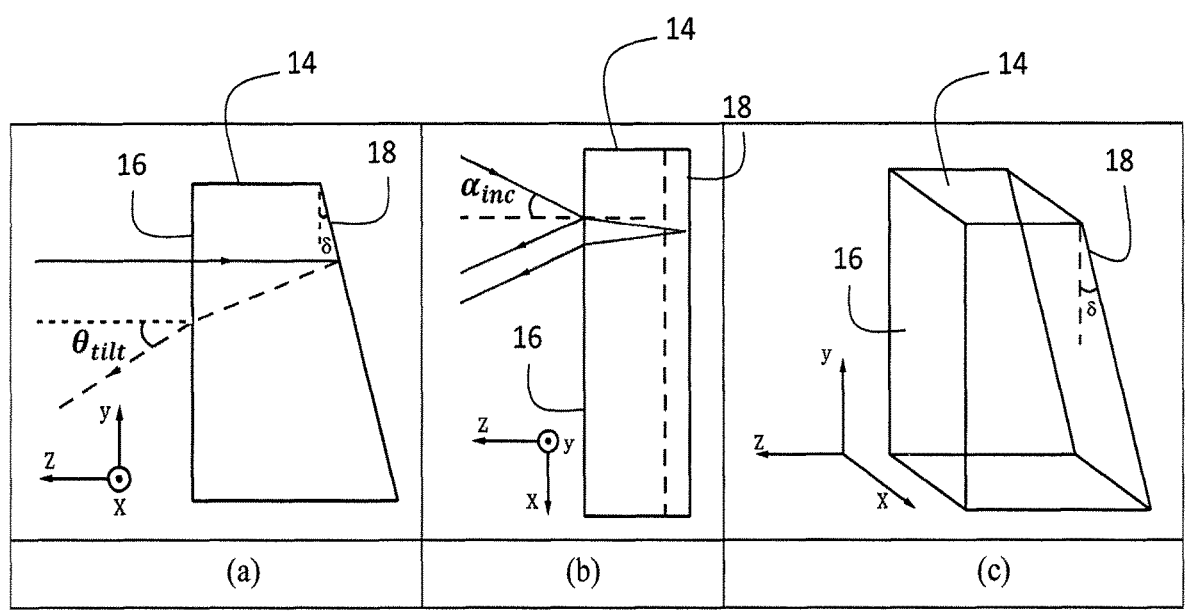

Referring to FIG. 2, wedged-glass TOE 14 is a trapezoidal prism having a right trapezoid cross-section. Provided that the path-length difference of the two reflected beams is less than the coherence length of the light, they interfere in the region where they overlap. As a result, any light incident on front face 16, which is the lateral face defined by the right angles of the right trapezoid of wedged glass 14, will produce an interference pattern as a result of reflection by front face 16 as well as the rear face 18 that opposes lateral face 16.

As seen in FIG. 1, wedged-glass TOE 14 is aligned with the lateral face 16 defined by the right angles of the right trapezoid facing the optical axes of lenses 12 and oriented at angle A thereto. An incoming beam is incident at an angle of incidence $\alpha_{inc}$, generating two reflections. The first reflection is from front face 16 of wedged glass 14. The second ray is refracted and reflected from the internal wedged surface 18 of wedged glass 14, but forming a tilt angle $\theta_{tilt}$ with the horizontal. A digital camera 20 is aligned with wedged glass 14 to capture images of any light is reflected by front face 16 and rear face 18 of wedged glass 14.

Figure 3:
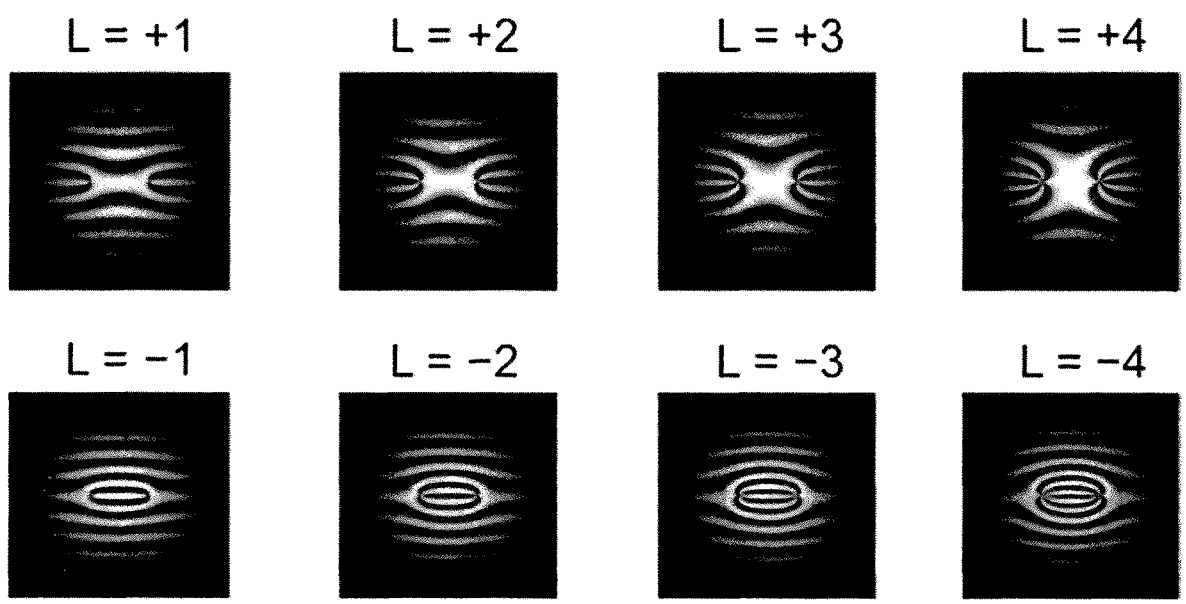

Referring to FIG. 3, when an ordinary laser beam is incident along axis X-X, it will produces a pattern of bright and dark fringes on camera 20 that form a set of parallel lines. When the beam carries an optical vortex, it will generate a pattern that is distinctive of the topological charge of the vortex. For example, FIG. 3 shows examples of the patterns that are created by beams with different topological charges, e.g., L=-4 through +4. It can be seen in FIG. 3 that beams with positive topological charges produce patterns comprising forks with conjoined handles, while beams with negative topological charges produce patterns that comprise forks with conjoined tines. The topological charge is given by the number of tines minus 1.

The present invention thus provides a method of determining the topological charge of an optical beam. First, the light beam carrying the vortex is sent through two confocal lenses 12 and reflected by TOE 14 for imaging by camera 20. Camera 20 digitally images the interference pattern. The digital image is then processed to detect the particular interference pattern, i.e., number of tines and their orientation, to identify the topological charge of the beam. These distinctive patterns may thus be used to unambiguously identify the topological charge of the optical beam using computational tools that interpret the pattern and identify the topological charge of the beam that produced the pattern. Information encoded embedded in the optical vortex on transmission via changes in the topological charge of a beam may thus be decoded to extract the information at the receiving end. Optical beams carrying optical vortices may therefore be used to communicate over free space or optical fibers. As the determination of the topological charge is essential to decoding the information in the beam, the present invention provides an unambiguous approach for obtaining the value of the topological charge.

EXAMPLE

The analysis of the interference pattern may be performed on an optical beam that carries an optical vortex with topological charge l. The electric field amplitude of the two reflected rays labeled i=1; 2, expressed in terms of their local coordinate frame, is given by $$E_i = \varepsilon_i(x_i, y_i, z_i) \exp[-ikz_i + i\ell\phi_i - i\Phi_i(x_i, y_i, z_i)], \quad (1)$$

where the transverse azimuthal phase is:

$$\phi_i = \tan^{-1}\left(\frac{y_i}{x_i}\right), \quad (2)$$

(looking into the beam), and the phase due to the curvature of the wavefront is $$\Phi_i(x_i, y_i, z_i) = \frac{k(x_i^2 + y_i^2)}{2R(z_i)}, \quad (3)$$

with the wavenumber k and wavelength λ related by 2π/λ, and $R(z_i)$ being the radius of the curvature of the wavefront.

The reflection in the horizontal plane produces a horizontal displacement between the two beams, given by $$s = \frac{t \sin(2\alpha_{inc})}{(n^2 - \sin^2(\alpha_{inc}))^{1/2}}, \quad (4)$$

where n is the refractive index of the glass, and t is the average thickness of the shearing interferometer. For experimental parameter values (n=1.457, t~2.6 mm and $\alpha_{inc}$~40°), the calculated (measured) displacement was s~2.0_2.3+/-0.1) mm. Simulations show that the best displacement between the two reflections is about one full width of the beam (s~2w), which was not hard to achieve. The overall rotation of the plate is specified by the angle β, as seen in FIG. 2. When β=0, the tilt angle is given by $$\theta_{tilt} = 2\delta(n^2 - \sin^2(\alpha_{inc}))^{1/2}. \quad (5)$$

With the nominal value of δ=40 arcsec, a fringe density is calculated at $\theta_{tilt}/\lambda \sim 0.8$ mm-1. The measured fringe density was $0.9+/-0.2$ mm$^{-1}$.

Figure 4:
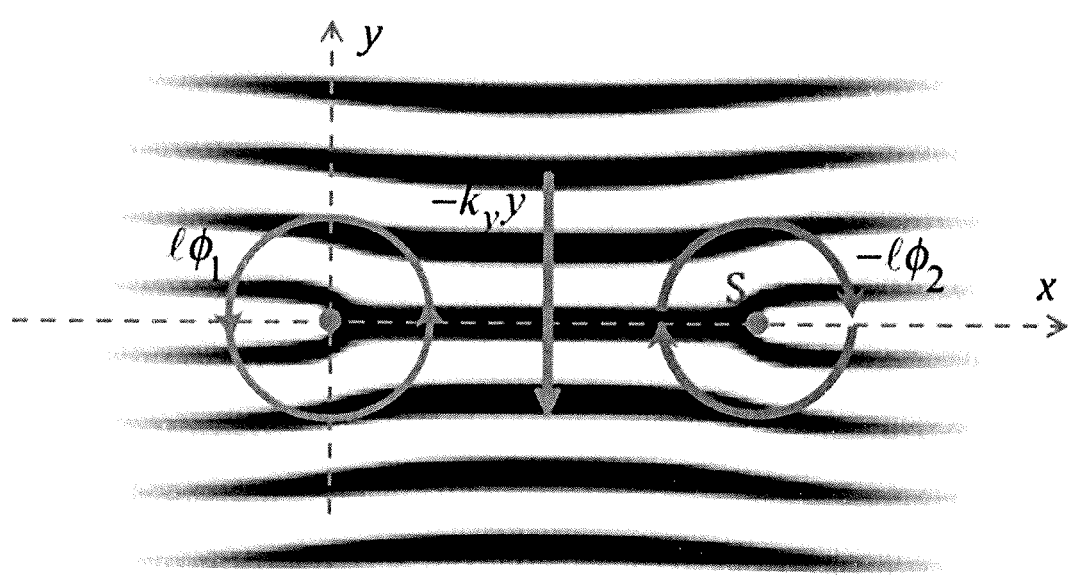

In application, the wavefront radius of curvature (R) was adjusted to be infinite using two confocal lenses, as seen in FIG. 1, rendering the term given by Eq. (3) equal to zero. This adjustment of rendering R to be infinite is referred hereafter as planarizing the wavefront. By applying the small-angle approximation, the relative phase between the two beams $\varphi = \varphi_{back} - \varphi_{front}$ is $$\varphi = -k_y y - \ell \phi_2 + l \phi_1 + \varphi_0, \qquad (6)$$

where we have accounted for the topological-phase inversion upon reflection, and where we used the transformations to the observing plane:

$$y = y_1 = y_2, \qquad (7)$$

$$x = x_1 = x_2 + s, \qquad (8)$$

$$z = z_1 = z_2 + \theta_{tilt} y - D, \qquad (9)$$

where $k_y = k\theta_{tilt}$ and the phase $\varphi_0$ incorporate the optical path difference between the beams $D \sim 6.8$ mm. The terms of Eq. (6) reveal the existence of three phase gradients in the field: the phase gradient due to each vortex and the gradient due to the tilted reflection (caused by the beam reflected by the inner surface of the wedged optical flat). The total gradient of phase is given by $$\mathrm{grad}\ \varphi = -k_y \hat{y} + \frac{\ell}{r_1} \hat{\phi}_1 - \frac{\ell}{r_2} \hat{\phi}_2, \qquad (10)$$

where $\hat{\phi}1$ and $\hat{\phi}2$ are the unit vectors that are azimuthal with respect to each of the vortices, and $r_1$ and $r_2$ are the respective radial distances from the vortices. Per the orientation of the wedged optic, the gradient of the tilt phase is in the $-\hat{y}$ direction. FIG. 4 illustrates the pattern for l=+1, as seen by camera 20. Fringes are shown overlaid on a coordinate frame. The direction of the phase gradients were also labeled for the particular example. When 0<x<s and y=0 (i.e., a point in between the two vortices) the unit vectors are $\hat{\phi}_1 = +\hat{y}$ and $\hat{\phi}_2 = -\hat{y}$ and, thus, the total gradient is $$\mathrm{grad}\ \varphi|_{0<x<s} = -\left(k_y - \frac{\ell}{x} - \frac{\ell}{s-x}\right)\hat{y}, \qquad (11)$$

whereas the gradients to the left of the left vortex (x<0, for which $\hat{\phi}_1 = -\hat{y}$ and $\hat{\phi}_2 = -\hat{y}$) and to the right of the right vortex (x>s, for which $\hat{\phi}_1 = +\hat{y}$ and $\hat{\phi}_2 = +\hat{y}$), respectively, are $$\mathrm{grad}\ \varphi|_{x<0} = -\left(k_y + \frac{\ell}{|x|} - \frac{\ell}{s+|x|}\right)\hat{y}, \qquad (12)$$

$$\mathrm{grad}\ \varphi|_{x>s} = -\left(k_y - \frac{\ell}{x} + \frac{\ell}{x-s}\right)\hat{y}. \qquad (13)$$

Figure 5:
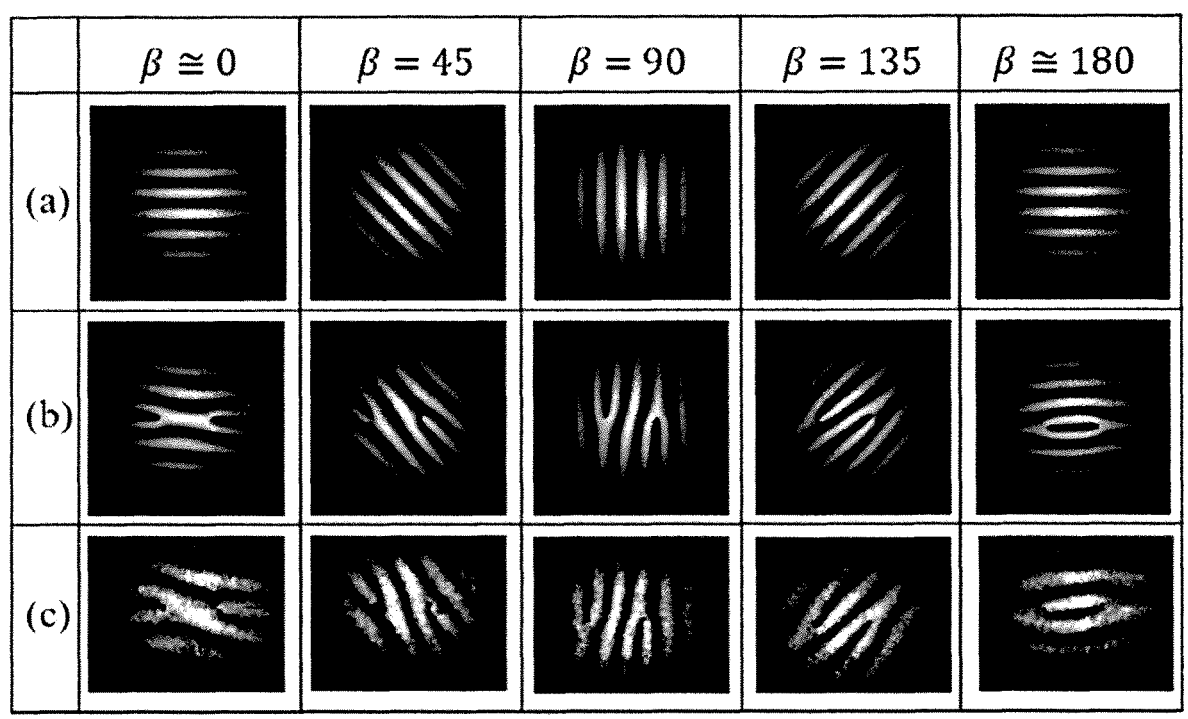
FIG. 5 is a series of images of interference patterns as a function of the orientation of the wedged optical flat ($\beta$) with computer models for l=0 and l=1 in rows (a) and (b), respectively, and experimental data for l=1 in row (c)

Thus, we can see that the phase gradient has a smaller magnitude between the vortices than outside them, giving rise to three distinct regions of fringe density: lower for 0<x<s, and higher for x<0 and x>s. This gives rise to the pattern of conjoined forks with their handles connected. In simpler terms, and using Eq. (6), the phase due to the tilted reflection, $-k_y y$, increases in the $-y$ direction. The phase of the left vortex, $l\phi_1$, increases counter-clockwise, whereas the phase of the right vortex, $-l\phi_2$, increases clockwise. In the region between the centers of the two beams (0<x<s), the phases of the two displaced vortices increase in the same direction, but opposite the phase due to the tilted reflection and, thus, the total phase is less than $|k_y y|$. Conversely, for x<0 and x>s, the phases $l\phi_1$ and $-l\sigma_2$ increase in opposite directions, but the net phase due to them increases in the same direction as the tilted phase and, thus, the magnitude of the total phase is greater than $|k_y y|$. Greater or lesser fringes in the middle region relative to the outer regions create forks that are connected by their tines or handles, respectively. What occurs depends on the sign of the input vortex relative and the direction of the tilted reflection (up or down). In the example, if the wedge of the optical flat opened upward (positive y-direction), the forks for positive topological charge would be seen connected by the tines. This is shown in FIG. 5.

In an experiment, the shearing interferometer was rotated angle β to change the direction of the transverse component of the k vector generated by the wedged side of the interferometer. The corresponding phase shift of the second beam was then $-k\theta_{tilt} (\cos \beta_y + \sin \beta_x)$. This rotated the orientation of the fringes about the z-axis. Since the azimuthal component of the phase was linearly proportional to l for pure LG modes, as encoded in the SLM and, since the mode centers were displaced laterally by the plate thickness, the forks rotated with β about their centers. This is shown in FIGS. 5(b) and 5(c). As shown in FIG. 4, the intensity pattern for β=0 looks like two forks with their handles connected. As the shearing interferometer rotates, the forks rotate, and the handles disconnect. When β=90°, the phase gradient due to the tilt is in $-\hat{x}$ direction, so we see the vertical fringes. For the left beam, the region above the center of the beam has azimuthal phase gradients also pointing in the $-\hat{x}$ direction. The two gradients are in opposite directions below the vortex. Therefore, the difference in gradients above and below the vortex creates a fork with tines pointing up. By the same reasoning, we can find the fork tines for the second beam on the right side point down. This is shown in FIG. 5. When β=180°, the reverse of the β=0 case is true and, thus, in the center region, the fork tines are connected. If l=−1 is interfered with β=0°, the same result would be achieved as when interfering l=+1 with β=180°. The orientation of the measured fringes shows excellent agreement with the computer simulations.

A very important property of this type of shearing interferometry is that it can be used to determine the value of the topological charge l. The direction of the tilt angle of the wedge (up or down) leads to distinct shapes of the pattern (tines in or out, respectively). This leads to obtaining the sign of l. The number of tines minus 1 gives the magnitude of l. This can be done by a simple visual inspection of the interference pattern. In FIG. 4, modeling and measurements for several cases are shown. To test this, optical beams prepared with a spatial light modulator (SLM) were sent to the shear interferometer with β=0. The observed fork patterns shown in row (b) of FIG. 4 are in agreement with the computer modelings, as shown in row (a). The equipment was kept in fixed positions while changing l. In all of the cases, the lenses were adjusted to produce a planar wavefront with a l=0 mode. Deviations of planaticity of the wavefront curvature may explain the slight tilt of the fringes. The phase $\varphi_0$ [in Eq. (6)] was adjusted in the simulations to match the experiment (90° for |l|=2; 5 and 180° for |l|=3; 4).

Repeating the same experiment for l<0 gave the results presented in rows (c) and (d) which show forks with tines connected. Fork patterns in general have a saddle in the gradient, also known as the stagnation point of the wave dislocation. This saddle is along the handle of the fork. The distance between the saddle of the fork and the center of the fork (the singularity) increases with decreasing tilt phase. The handle of the fork is visible as long as the saddle is close to the singularity. That is, the fork handle is visible if the gradient of the tilt phase is greater than the gradient of the phase of the vortex. In this case, there are two saddles in the conjoined fork pattern. The location of the saddles is obtained by equating Eq. (10) to zero. Consider the case discussed earlier in connection with top row of FIG. 3, which shows two forks joined by their handle. When the gradient of the tilt phase decreases relative to the gradient due to the vortices (say by increasing the magnitude of l), the two saddles move closer to each other until they merge. At that point, we can no longer see the handle of the conjoined forks, and this method ceases to be effective for determining the value of l by visual inspection. The point where the saddles disappear then imposes a maximum value of l that can be determined given the parameters of the optical wedge $$\ell_{max} = \frac{sk_y}{4}. \tag{14}$$

For these parameters, $l_{max}$~4. Indeed, it is possible determine with confidence the topological charge of the patterns in FIG. 6 for l≤5. The pattern for l=5 is difficult to read for the case of rows (a) and (b). The case when the tines are joined [rows (c) and (d)] is more forgiving, and one can still read the magnitude of the charge by counting fringes; this can be done all the way up to l=10, although with difficulty. To increase the value of $l_{max}$, δ must be increased (and, therefore, $k_y$). For making this type of adjustment, an air-spaced shear interferometer may be more suitable. The value of $k_y$ can be obtained directly from the fringe density for l=0.

Figure 6:
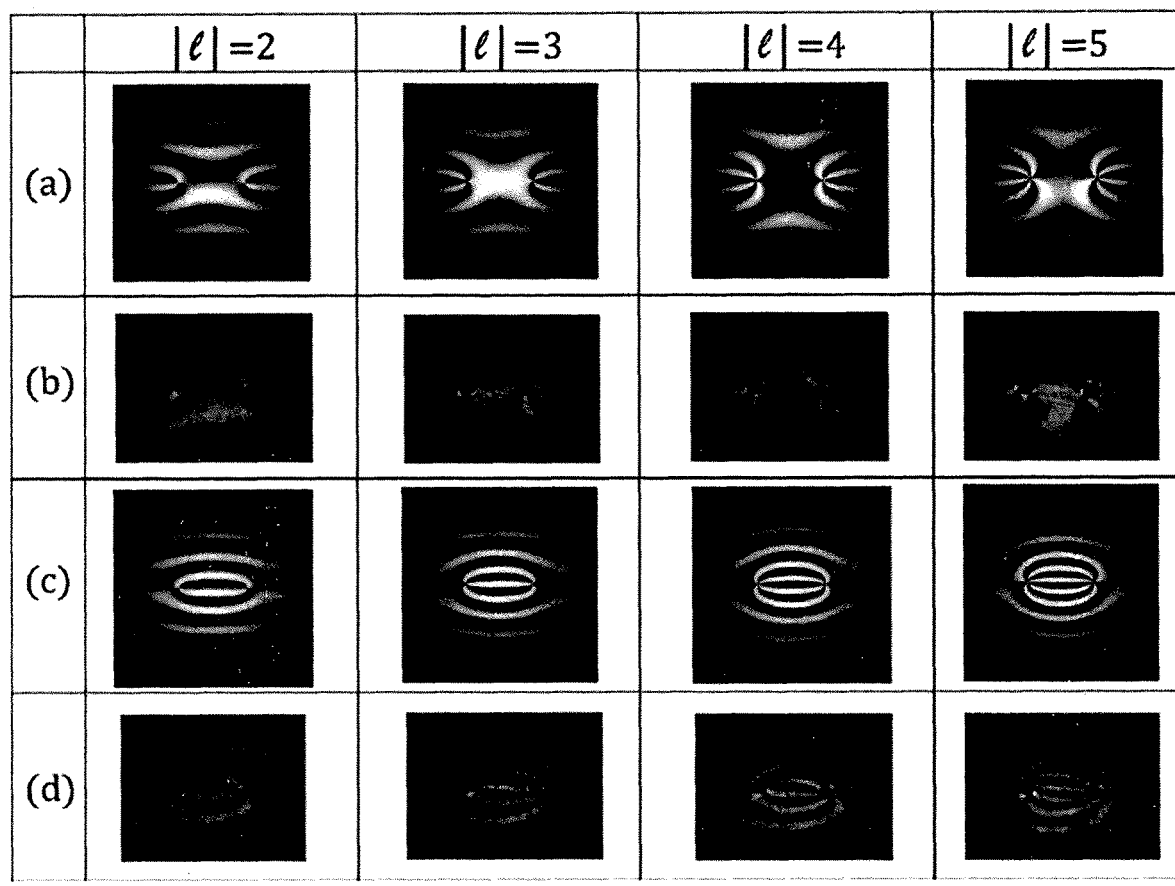
FIG. 6 is (a) a computer model the topological charge l=2; 3; 4; 5; (b) experimental measurements for the same l's as in (a); (c) a computer model for l=−2; −3; −4; −5; and (d) experimental measurements for the same l's as in (c)

It is worth noting that there are no dark spots at the forks of the modelings of FIGS. 5 and 6 because they assumed a Gaussian mode with a phase vortex superimposed. A 4-f imaging system was used to flatten the wavefront curvature, which imaged the SLM onto the camera, so one would expect, in principle, the data not to show dark spots. However, due to the imaging resolution, we do see small dark spots at the center due to destructive interference. The dark spots are much smaller than what one would expect from imaging an LG mode in the far field. The fringe patterns were investigated for other non-4-f imaging geometries, where the dark spots were larger. However, the fringe patterns remained the same. Accordingly, analysis of the results of using system 10 could be implemented using pattern recognition in a device, such as a computer, that is coupled to camera 20, and programmed to detect and analyze the received images according to the approach described above.

Shearing interference thus provides a simple and useful method to determine the sign and magnitude of the topological charge of the optical modes bearing optical vortices, such as LG. The patterns were investigated as a function of the angle at which the fringes are oriented, as well as a function of the sign and magnitude of the topological charge. This method can also be used to determine the component modes that are involved in non-separable superpositions of modes and polarization. The Brewster angle suppression can be used to selectively observe only one polarization component. We were also able to determine the modal composition of superpositions involving +|l| and −|l| modes.

Example 2

The present invention may also be used to determine the superposition of two beams, with each carrying an optical vortex. In such a situation, the vortices of the component beams are redistributed in a known way. Shear interferometry may be used to unravel the pattern of vortices and determine the topological charge of each of the component beams. Furthermore, additional parameters of the superposition that can be obtained by this method are: relative amplitude (within a range) and relative phase.

Figure 7:
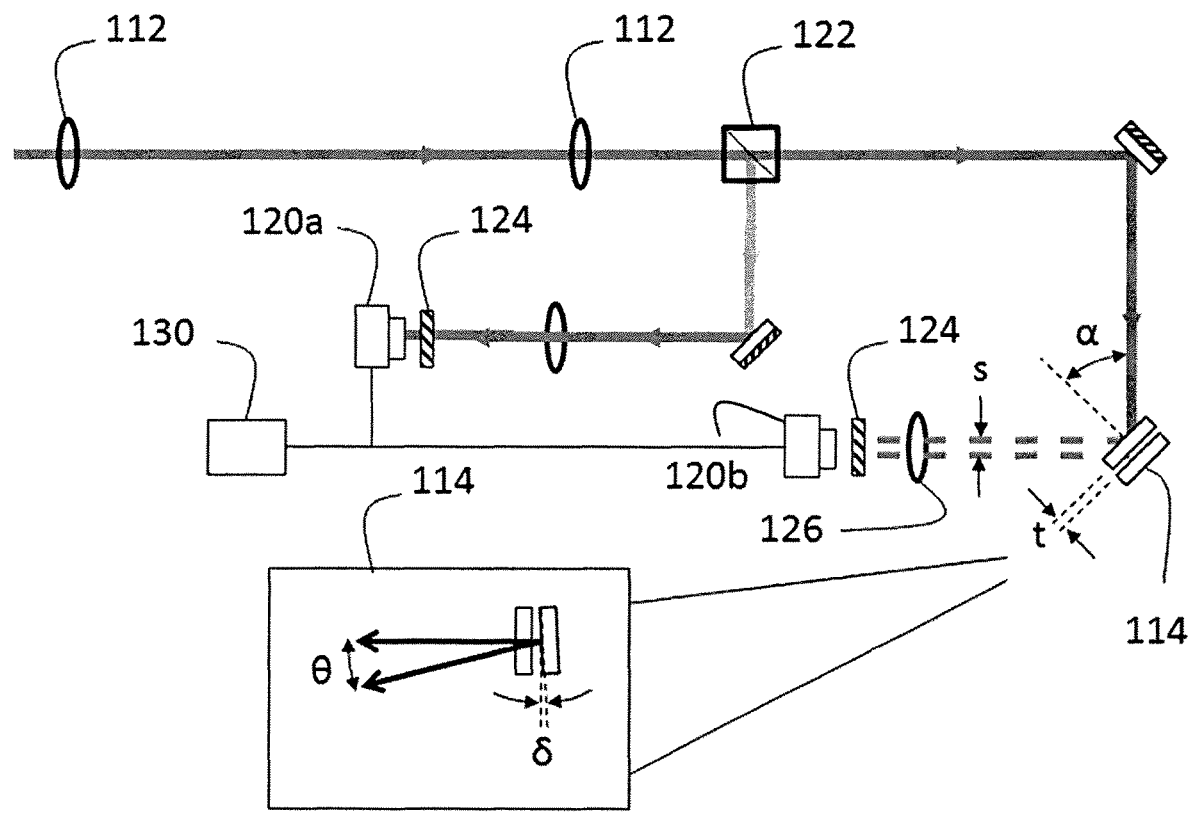
FIG. 7 is a schematic of an apparatus including air-spaced shear TOE according to the present invention.

Referring to FIG. 7, system 100 includes an air-spaced trapezoidal optical element (TOE) 114 for determining the superposition of two beams. As with EXAMPLE 1, system 100 includes a series of lenses 112 that may be coupled to whichever equipment generates or provides the superpositioned beams. A beam splitter 122 is aligned with lenses 112 to provide any beam received via lenses 112 to a first digital camera 120a and to TOE 114. TOE 114 is aligned with a second digital camera 120b so that second camera 120b can receive reflected signals from TOE 114. A neutral density filter 124 is associated with both first digital camera 120a and second digital camera 120b, respectively.

As further seen in FIG. 7, interferometer 114 is aligned relative to an incident beam according to an angle of incidence α, a shear displacement s, and has a shear plate separation t and second plate tilt δ. In a beam preparation stage, the output of a helium-neon laser may be spatially filtered by passage through a single-mode fiber coupled to collimators. The polarization of the beam may be adjusted for optimal diffraction with a SLM. The first-order diffraction off of the SLM constitutes the optical beam to be analyzed by system 100 according to present invention.

The beam wavefront was planarized and the beam size expanded with the pair of lenses 112 and divided by beam splitter 122 to observe the mode with first digital camera 120a. The second beam expansion was needed for a greater overlap of the two sheared reflections. The light transmitted by beam splitter 122 was also steered onto TOE 114. The beam bearing the shear interference pattern was slightly focused by a lens 126 to fit the mode within the digital camera sensing element of camera 120b.

Analysis of the results of using system 100 are described herein and could be implemented using pattern recognition in a device 130, such as a computer, that is coupled to cameras 120a and 120b, and programmed to detect and analyze the received images according to the following approach. Collinear superpositions of paraxial beams bearing optical vortices produce a composite mode where the location of the vortices reveals in a straightforward way the parameters of the superposition: the relative amplitude and phase of the component modes and their respective topological charge. This is due to a basic feature of vortex beams: the modal pattern consists of a brightest inner ring with a radius that depends on the topological charge l:

$$r_l \propto \ell^a, \tag{1}$$

where a is a positive number. For pure Laguerre-Gauss beams, $r_l = (l/2)^{1/2}w$, where w is the beam half width.

The superposition of two vortex modes is given by:

$$u(r,\phi) = \cos\beta u_{l_1}(r,\phi) + \sin\beta u_{l_2}(r,\phi)e^{i\gamma}, \tag{2}$$

where $(r, \phi)$ are the polar coordinates in the reference frame of the transverse mode, $l_1$ and $l_2$ are the topological charges of the two modes, $\beta$ in this case specifies the ratio of the amplitudes of the two modes (there is no rotation of the TOE) and $\gamma$ is their relative phase. The functional expression for the modes is given by $u_l$. It is then possible to distinguish two cases:

First, when $|l_1|<|l_2|$, the modal pattern is quite predictable and shows the following features. The center of the pattern has an optical vortex of charge $l_1$. This is what is theoretically predicted. In practice, a multiply-charged point is very susceptible to perturbations, and so, the center of the pattern may consist of $|l_1|$ singly-charged vortices of sign $l_1/|l_1|$ in close proximity. The center is surrounded by $|l_1-l_2|$ vortices arranged symmetrically and located at a radial distance $r_v$ that satisfies:

$$\tan\beta = \frac{|{}^u\ell_1(r_v, \phi_v)|}{|{}^u\ell_2(r_v, \phi_v)|}. \tag{3}$$

For the case of pure Laguerre-Gauss modes, the analytical expressions of $u_l$ are simple, and so, $r_v$ can be deduced:

$$r_{v,LG} = \frac{w}{\sqrt{2}}\left(\frac{|\ell_2|!}{|\ell_1|!\tan^2\beta}\right)^{\frac{1}{2(|\ell_2|-|\ell_1|)}}. \tag{4}$$

The angular position of the vortices depends on the relative phase between the two modes:

$$\phi_v = \frac{\gamma + n\pi}{\ell_2 - \ell_1}, \tag{5}$$

where $n=1 \ldots (2|l_1-l_2|-1)$ is an odd integer.

For example, when $l_1=+1$ and $l_2=-2$, the composite mode for $\beta=45°$ consists of a central vortex of charge $+1$ surrounded by three vortices of charge $-1$ located at a radius $r_v$.

Second, when $l_1=-l_2$ and $\beta\neq 45°$, the pattern contains a central vortex of charge $l_1/|l_1|$. At $f=45°$, there is no central vortex, and the composite mode has $2|l_1|$ radial lines (nodes) of $180°$ shear phase, evenly separated. The relative weights of the modes produce subtle variations in intensity, which yields greater uncertainty in the determination. The method of the present invention is much more effective for the first case.

The shear interference pattern of a beam bearing an optical vortex of topological charge l has the following characteristics. The pattern consists of conjoined forks formed by the interference of the vortex beam with a displaced and tilted copy of it. If the TOE is air spaced, the centers of the vortices are displaced by:

$$s=2t\sin\alpha, \tag{6}$$

where $\alpha$ is the incident angle and t is the average separation between the reflecting surfaces. This relation is modified if the fringes are not parallel to the displacement of the two modes. The overall phase of the pattern is determined by the optical path-length difference and the reflection phases, which for our case is given by:

$$\psi = \frac{4\pi t\cos\alpha}{\lambda} + \pi, \tag{7}$$

where l is the wavelength of the light. The fringe density of the pattern is given by:

$$\rho \simeq \frac{\theta}{\lambda}, \tag{8}$$

where:

$$\theta = 2\delta\cos\alpha \tag{9}$$

is the angle that the back reflection makes with the horizontal. The convention q>0 is used when the beam coming from the back reflection is tilted downward and assuming that the front reflection is in the horizontal plane. $\delta$ is the wedge angle between the two reflecting surfaces.

When the TOE is a solid piece, these relations are modified slightly. The air-spaced interferometer is very convenient for freely changing the above parameters. In a typical situation, aiming for a total of 15 fringes over the full size of the beam of 4 mm (with a=450) requires a tilt $\delta$~5.8 arcmin. The pattern representing an optical vortex consists of forks joined by their handles or their tines when the topological charge is positive or negative, respectively, as discussed below. The correlation between the patterns and sign of the topological charge switches when $\theta<0$.

The effectiveness of the method depends on the radial dependence of the vortex mode. The best modes are those where the dark regions around the vortices are small relative to the beam diameter. This is because the pattern is the interference of two displaced identical modes. Such modes are the ones generated, for example, with a forked diffraction grating, spiral phase plate, or digital phase modulation; and known as hypergeometric-Gaussian modes or Kummer modes, which are expressed in terms of Bessel functions. Laguerre-Gauss modes are categorized by two indices: the azimuthal index or topological charge ' and the radial index p specifying the number of nodes in the radial coordinate. Pure p=0 modes are the hardest to diagnose. This is because most of the light intensity is limited to a well-defined ring, and so, the signal to noise ratio of the interference patterns is low in the dark regions. Hypergeometric-Gaussian modes generated by phase-only encoding are in a superposition of Laguerre-Gauss modes of the same l, but different p. Such modes have intensity patterns featuring a main ring surrounded by broad radial modulations. They are much better because most regions of overlap of the modes have non-zero intensity and thus produce good fringe visibilities. When investigations are limited to a laboratory area, it is often convenient to image the mode encoding element via a four-f sequence of lenses. That way, the beam reconstructed on the camera is nearly a Gaussian (the input to the encoding device), with the phase encoding. Imperfections in the encoding, imaging apparatus and diffraction itself make the modes with distinct topological charge distinct, as well, enabling optical processing with such modes, referred to as "near field."

Figure 8:
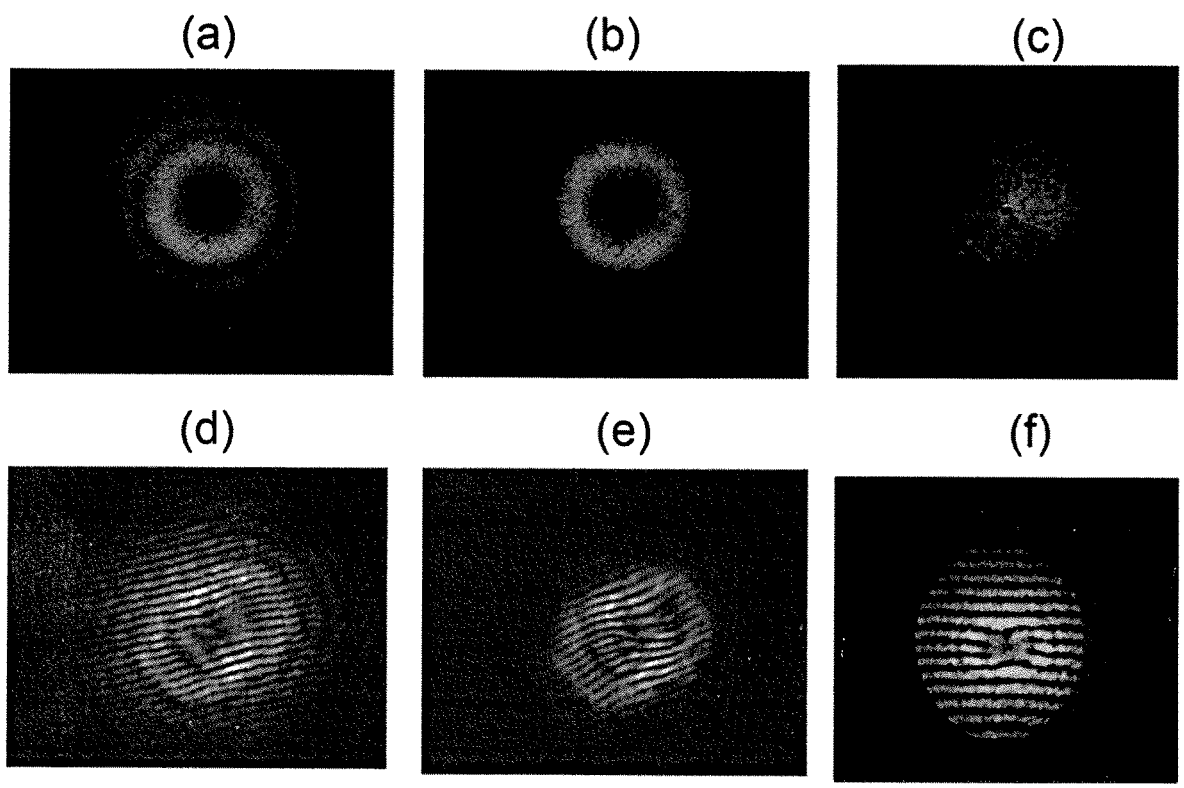
FIG. 8 is a series of images for beam modes (a-c) and corresponding shear interferograms (d-f) of vortex beams generated using phase modulation only (a,c), phase and amplitude modulation (b) and far-field (a,b) and near-field imaging (c), where all modes have l=+2.

FIG. 8 shows three types of modes that were prepared with a spatial light modulator and their corresponding shear interference pattern below. They were taken with the air-spaced TOE, which allowed for adjustment of the plate separation. The modes were generated by diffraction off the phase grating of a spatial light modulator with and without amplitude modulation. The amplitude modulation produced a pure Laguerre-Gauss mode (FIG. 8b), whereas the lack of amplitude modulation produced a hypergeometric-Gauss mode (FIG. 8a) as described above. Near-field imaging produced a Gaussian mode with phase encoding (FIG. 8c).

Pure p>0 Laguerre-Gauss modes are much harder to determine because they contain more than one ring, with consecutive rings being π out of phase. This feature complicates the pattern produced by the shear interferometer. The darkened regions in the modes of FIG. 8a through c are candidates for locations bearing optical vortices, but only the shear interference pattern can confirm the association of darkened regions with vortices.

The main virtue of this approach of the present invention involves identifying superpositions of vortex-modes. When this involves equal-amplitude superpositions ($\beta=45°$ in Equation (2)), it is possible to clearly determine the modes, regardless of type. Beyond inspecting the static images of the patterns, it is possible to determine the relative phase of each image point by slightly varying the incident angle $\alpha$ of the light on the shear interferometer and fitting the phase of the pattern.

FIG. 9 shows the example of the superposition of $l_1=+1$ with $l_2=-2$ (b=45°). The Gaussian mode is used with phase encoding to best appreciate the method. The modes are determined using the following procedure.

First, the fork pattern is examined in the center of the mode. From it, we extract the magnitude $|l_1|$ and sign $\sigma_1=l_1/|l_1|$ of the mode with smaller topological charge (recall that we assume $|l_1|<|l_2|$). No vortices means $l_1=0$. In the case of FIG. 9b, the conjoined-fork pattern of a +1 vortex is seen, revealing that $l_1=+1$. In the table in FIG. 9a, the correspondence between the sign of the topological charge of the vortex and its forked signature in the shear pattern is shown.

Second, the number of peripheral vortices N are counted (in FIG. 9b, N=3). The type of conjoined forks specifies their sign. If the sign of peripheral vortices is the same as the one at the center, then:

$$\ell_2 = (N+|\ell_1|). \tag{10}$$

If the sign is different than the center vortex, then:

$$\ell_2 = -\sigma_1(N-|\ell_1|). \tag{11}$$

In the example of FIG. 9b, because the sign of the peripheral vortices is different from the one of the central vortex, then from their number (3) one it is concluded that $l_2=-2$ Finally, the angular orientation of the vortices reveals the relative phase between the modes per Equation (5). In the example, $\gamma\sim0$.

FIG. 10 shows four cases with distinct values of $(l_1, l_2)$: (1, -2), (1, -4), (2, -4) and (-1, -2). The figure shows views of the mode images in Panes (a-d) and the shear interferograms in (e-h). All cases were taken in the far field produced by the non-amplitude modulated encoding. The mode images show dark regions where the vortices are located. The presence of a vortex is only confirmed by the appearance of the forked dislocations in the interferograms. The first case (a,e) is similar to the one in FIG. 9b, featuring one central +1 vortex surrounded by three −1 vortices. The second case $(l_1, l_2)=(1, -4)$ in (b,f) has again a central +1 vortex surrounded by five −1 vortices. The third case with (2, −4) underscores the method, showing a +2 central vortex, surrounded by six −1 vortices. The case (−1, −2) involves $\gamma=\pi/2$. When $\gamma=0, \pi$, the peripheral vortex is along the horizontal axis of the pattern. When the fringes are lined up along the direction connecting the centers of the displaced modes, two forks connected by their handle reveal positive vortices, whereas two forks conjoined by the tines reveal negative vortices. If the alignment is not as good, then the conjoined forks are laterally displaced, as illustrated in FIG. 9a, so that for example, in the case of negative vortices, the forks share only one tine. They can also share no tines and just be laterally displaced. We can also make adjustments to a second tilt of the air-spaced interferometer to tilt the fringes along the direction that connects the centers of the displaced vortices. The case of FIG. 9b shows clearly that the forks representing each vortex are joined by both tines. Depending on the value of the local phase difference between the two interfering reflections, the forks are more clearly observed either via the bright or dark fringes.

The comparisons of the previous cases involve equal-amplitude superpositions. For a certain range of parameters, we can determine the superposition of modes with unequal amplitudes. A superposition can be determined as long as light from one reflection overlaps with all vortex locations of the other reflection, and vice versa. Such a situation is the requirement for producing a measurable fork pattern for each vortex. In the case of the pure Laguerre-Gauss modes, the settings of the shear interferometer (separation and tilt) have to be adjusted for the particular situation, whereas for the hypergeometric-Gauss or Gaussian with phase encoding, no specific settings are required.

The peripheral vortices that surround the central vortex, located at a radius $r_v$, are seen as long as $r_v<R$, where R is the visible radius of the beam. This sets a lower bound for the value of $\beta=\beta_{min}$ in Equation (2), which depends on the type of vortex mode: lower for non-Laguerre-Gauss modes. The pattern of the case of (+1,−2) in FIG. 11a was created with $\beta=35°$. The peripheral vortices are close to the edge of the beam. Depending on the type of mode, $\beta_{min}$ can be between 30° and 40°.

In a similar manner, as $\beta\to90°$, the singly-charged vortices reach the center to form a region of charge $l_2$. For $\beta>\beta_{max}$, it is not possible to distinguish clearly the central vortex from the peripheral vortices, and so, it is not possible identify the component modes. From experience, $\beta_{max}\sim70°$. FIG. 10c shows the case for $\beta=60°$. Sequences of a number of cases with varying values of $l_1$, $l_2$ and $\beta$ were taken.

An analysis of the variation of $r_v$ with $\beta$ was performed by measuring the values of $r_v$ in the images. In FIG. 12, $r_v/R$ is shown as a function of $\beta$ for the case of (+1,−2). The uncertainties are standard deviations of the measurements. Those measurements were compared with the predicted value of $r_{v-LG}/R$ scaled by a factor of $\sqrt{2}$.

The analysis discussed above shows that shear interferometry can be used to identify the topological charges of modes in superpositions. This determination may be made for most pure or semi-pure modes bearing optical vortices. This has been shown with modes imaged in the far field, as well as in the near field. The method can be used to determine the relative weights of the two modes when their amplitudes are not too dissimilar (in the language of Equation (2), for $30°\le\beta\le70°$). These results also apply for modes in the far field, which may be used in communications. If the use of vortex beams is limited to the laboratory environment, one can use engineered near-field patterns, which allow greater flexibility in the encoding of vortices and greater ease in their detection by shear interferometry.

As described above, the present invention may be a system, a method, and/or a computer program associated therewith and is described herein with reference to flowcharts and block diagrams of methods and systems. The flowchart and block diagrams illustrate the architecture, functionality, and operation of possible implementations of systems, methods, and computer programs of the present invention. It should be understood that each block of the flowcharts and block diagrams can be implemented by computer readable program instructions in software, firmware, or dedicated analog or digital circuits. These computer readable program instructions may be implemented on the processor of a general purpose computer, a special purpose computer, or other programmable data processing apparatus to produce a machine that implements a part or all of any of the blocks in the flowcharts and block diagrams. Each block in the flowchart or block diagrams may represent a module, segment, or portion of instructions, which comprises one or more executable instructions for implementing the specified logical functions. It should also be noted that each block of the block diagrams and flowchart illustrations, or combinations of blocks in the block diagrams and flowcharts, can be implemented by special purpose hardware-based systems that perform the specified functions or acts or carry out combinations of special purpose hardware and computer instructions.

The air spaced TOE can be arranged either automatically (by motorized hardware) or manually to produce the fringe pattern that is most suitable for identifying the vortex content of the beam. Referring to FIG. 7, the parameters that can be changed are: (1) the separation of the 2 surfaces (t) to adjust the lateral displacement of the two reflections (s) via Eq. (6); (2) the angle of incidence ($\alpha$) to adjust the phase of the interference pattern ($\psi$) via Eq. (7); and (3) the wedge tilt ($\delta$) to adjust the fringe density ($\rho$) via Eqs. (8) and (9).

What is claimed is:

1. An apparatus for determining a topological charge of an optical beam, comprising:
   a pair of confocal lenses configured to planarize the wavefront of an optical beam extending along a first optical path;
   a trapezoidal optical element aligned with the pair of confocal lenses and oriented to define a non-perpendicular angle of incidence for the optical beam so that the optical beam is reflected along a second optical patch that is different than the first optical path, wherein the trapezoidal optical element extends along an axis and has a right trapezoid cross-section along the axis such that trapezoidal optical element includes a front face formed by the right angles of the right trapezoid cross-section and an opposing rear face that is not parallel to the front face to define a non-perpendicular angle of incidence for the optical beam and wherein the reflection of the optical beam by the trapezoidal optical element produces an interference pattern that corresponds to the topological charge of the optical beam; and
   an optical imager positioned along the second optical path to capture a digital image of the optical beam after reflection by the trapezoidal prism.

2. The apparatus of claim 1, wherein the interference pattern includes a plurality of forked structures having at least two conjoined handles if the topological charge of the optical beam is positive.

3. The apparatus of claim 2, wherein the interference pattern includes a plurality of forked structures having at least two conjoined tines if the topological charge of the optical beam is negative.

4. The apparatus of claim 3, further comprising a device coupled to the optical imager and programmed to identify the topological charge of the optical beam based on the interference pattern.

5. An apparatus for decoding modal superpositions of optical beams, comprising:
   a series of lenses configured to planarize the wavefront of a plurality of light beams;
   a beam splitter forming a second optical path and a third optical path that is different from the second optical path;
   a first optical imager aligned along the second optical path to capture digital images of the plurality of light beams;
   a trapezoidal optical element positioned along the third optical path and oriented to define a non-perpendicular angle of incidence for the plurality of optical beams so that the plurality of optical beams are reflected in a direction other than along the third optical path, wherein the trapezoidal optical element is an air spaced trapezoidal optical element and wherein the reflection of the plurality of optical beams by the trapezoidal optical element produces an interference pattern; and
   a second optical imager aligned with the trapezoidal optical element to capture optical images of the plurality of optical beams after reflection by the trapezoidal optical element.

6. The apparatus of claim 5, wherein the interference pattern corresponds to the topological charge of each of the plurality of optical beams.

7. The apparatus of claim 5, further comprising a device coupled to the first optical imager and the second optical imager that is programmed to identify the topological charge of the optical beam based on the interference pattern.

* * * * *